(12) United States Patent
Brauer

(10) Patent No.: US 7,608,950 B2
(45) Date of Patent: Oct. 27, 2009

(54) TRACTION MOTOR SHAFT CONNECTED TO VEHICLE GROUND VIA DRIVE GEAR

(75) Inventor: Michael Brauer, Möhrendorf (DE)

(73) Assignee: Siemens Aktiengesellschaft, Munich (DE)

( * ) Notice: Subject to any disclaimer, the term of this patent is extended or adjusted under 35 U.S.C. 154(b) by 500 days.

(21) Appl. No.: 10/550,125

(22) PCT Filed: Mar. 5, 2004

(86) PCT No.: PCT/EP2004/002288

§ 371 (c)(1),
(2), (4) Date: Oct. 20, 2005

(87) PCT Pub. No.: WO2004/082979

PCT Pub. Date: Sep. 30, 2004

(65) Prior Publication Data

US 2006/0125335 A1    Jun. 15, 2006

(30) Foreign Application Priority Data

Mar. 19, 2003   (DE) ............................... 103 12 254

(51) Int. Cl.
*H02K 11/00* (2006.01)
*H02K 5/00* (2006.01)

(52) U.S. Cl. ................. 310/68 R; 310/68 B; 310/68 C; 310/71; 310/83; 310/89; 310/90

(58) Field of Classification Search ............... 310/68 R, 310/68 B, 68 C, 71, 89, 90, 83; 361/42, 236; 439/92, 95, 620.11, 620.12, 620.13

See application file for complete search history.

(56) References Cited

U.S. PATENT DOCUMENTS

| | | | |
|---|---|---|---|
| 3,176,286 A | * | 3/1965 | Dschen ...................... 340/682 |
| 5,006,769 A | | 4/1991 | Posedel |
| 5,294,853 A | * | 3/1994 | Schluter et al. ........... 310/68 R |
| 2003/0057783 A1 | | 3/2003 | Melfi |
| 2006/0125335 A1 | * | 6/2006 | Brauer ...................... 310/68 R |

FOREIGN PATENT DOCUMENTS

| | | |
|---|---|---|
| DE | 26 21 069 A1 | 11/1977 |
| DE | 35 11 755 A1 | 10/1985 |
| DE | 94 18 804 U1 | 3/1995 |
| DE | 200 07 714 U | 10/2001 |

(Continued)

OTHER PUBLICATIONS

MacDonald et al.: "A practical guide to understanding bearing damage related to PWM drives", Pulp and Paper Industry Technical Conference, 1998, Conference Record of 1998 Annual Portland, ME, USA, Jun. 21-26, 1998, New York, USA, IEEE, pp. 159-165 XP010287631 ISBN: 0-7803-4785-4.

(Continued)

Primary Examiner—Quyen Leung
Assistant Examiner—David W. Scheuermann
(74) Attorney, Agent, or Firm—Henry M. Feiersisen; Ursula B. Day

(57) ABSTRACT

In order to prevent bearing currents, particularly in converter-operated traction motors (1), the housing (11) is grounded via a grounding capacitor ($C_{ground}$).

8 Claims, 4 Drawing Sheets

FOREIGN PATENT DOCUMENTS

| | | |
|---|---|---|
| EP | 0 391 181 B1 | 12/1994 |
| JP | 62 114401 A | 5/1987 |
| JP | 03 004855 A | 1/1991 |
| JP | 2001 309505 | 11/2001 |
| WO | WO 96/16467 A | 5/1996 |

OTHER PUBLICATIONS

Brochure Blumenbecker Firmengruppe: Technische Anleitung No. 5—Lagerströme in modernen AC-Antriebssystemen, ABB Automation Group Ltd. 2001.

Brochure Hübner Technik—Schutz vor Wellenströmen, Hübner Berlin, Jun. 10, 2005.

* cited by examiner

TRACTION MOTOR SHAFT CONNECTED TO VEHICLE GROUND VIA DRIVE GEAR

BACKGROUND OF THE INVENTION

The invention relates to a traction motor in vehicles with an electric or diesel-electric drive, the traction motor which is mounted in a housing being grounded.

In vehicles of the generic type, the traction motors are fed either directly from a power system or via a converter with electronic power actuating elements. The housings of the traction motors are grounded here via a grounding cable in the vehicle with an electric drive. Owing to the common-mode voltage (zero voltage), brought about in particular by a converter due to the principle involved, in the traction motor and the sudden changes in voltage at the terminals of the traction motor, of capacitive currents and arc discharges occur in the bearings in association with the parasitic capacitances in the traction motor and in the bearings of the traction motor.

Furthermore, operational reverse currents flow from the driver's own vehicle or from other vehicles via the bearings of the traction motor as a function of the selected grounding concept of the vehicle with an electric drive. This also causes damage to the bearings and to the lubricant and thus leads to premature failure of the bearings.

In order to avoid such damage to the bearings, electrically insulated bearings or insulated bearing bushings are used. Using insulated bearings or insulated bearing bushings prevents the classic wave voltages, low-frequency or DC operating currents and in particular capacitive bearing currents and arc discharges in the bearing which are due to the converter are reduced.

The disadvantage here is that the insulated bearings have a very high purchase value and require relatively sensitive installation in the drive so that the bearing insulation is not damaged. This can be confirmed by additionally checking the insulation after installation.

JP 001309505 describes a traction motor which is rigidly or permanently grounded. A capacitor merely reduces the interference currents of the vehicle with an electric drive.

JP 62114401 also has rigid grounding of the traction motor. The interference currents of the vehicle with an electric drive are returned to the source along the shortest path by means of capacitors.

SUMMARY OF THE INVENTION

The invention is accordingly based on the object of providing grounding for a traction motor which avoids the above-mentioned disadvantages in a simple manner.

The object is achieved by virtue of the fact that the housing of the traction motor is grounded via a capacitor.

As a result, the insulated bearings may be replaced entirely or partially by the significantly more cost-effective, electrically uninsulated bearings, and the protection of the bearings against damage by stray currents is ensured.

The low-frequency or DC operating reverse currents of the driver's own electric vehicle or of other vehicles which otherwise flow back directly via the rigid grounding to the motor are blocked by the capacitor. As a result, these current components do not flow via the bearings of the traction motor, or only do so to a very low degree.

For the high-frequency interference currents which are due to the converter the capacitor constitutes virtually a short-circuit (XC=1/jwC), i.e. the high-frequency currents can flow back on the shortest path in terms of EMC to the source as in the case of the rigid grounding by means of a grounding cable. This avoids capacitive or grounding currents flowing via the bearings.

The dimensioning of the capacitor significantly reduces the voltage across the bearings so that the dielectric strength of the bearing lubrication film is not exceeded, or is exceeded relatively rarely. Here, a capacitive voltage divider acts between the parasitic winding housing capacitance and the capacitance of the capacitor between the housing of the traction motor and the vehicle ground, for example chassis parallel to the air capacitance and the bearing capacitance. If the voltage at the bearings, that is to say the voltage across the capacitor, does not exceed dielectric strength of the lubrication film in the static case of 0.5 V or in the dynamic case of 2 to 10 V, the lubrication film acts as an insulator and thus prevents the capacitive bearing currents and arc discharges.

Circular currents and currents owing to a wave voltage across the bearings of the traction motor may be prevented in conjunction with this inventive capacitive grounding of the traction motor by making only one bearing electrically insulated.

It is advantageous if the capacitive grounding connection between the housing of the traction motor and ground is provided in the converter. That is to say a four-conductor cable is provided between the traction motor and converter, three conductors for supplying power and a cable for low-inductance provision of grounding.

In a further embodiment, the capacitive grounding connection is provided between the housing of the traction motor and the rotational speed sensor of the traction motor. That is to say the capacitor between the housing of the rotational speed sensor and the shielding of the sensor line is connected in or on the rotational speed sensor. The housings of the rotational speed sensor and traction motor are electrically conductively connected to one another here. It is particularly advantageous if the bearing voltage is monitored in each of the specified embodiments, i.e. said voltage is used as a measurement variable for the functional capability of the capacitor. In the case of a fault, the bearing voltage rises, thus giving a signal that unambiguously indicates the relationship with a faulty capacitor.

BRIEF DESCRIPTION OF THE DRAWING

The invention and further advantageous refinement of the invention according to features of the subclaims are explained in more detail below using schematically illustrated exemplary embodiments in the drawing, in which:

DETAILED DESCRIPTION OF PREFERRED EMBODIMENTS

Figure 1:
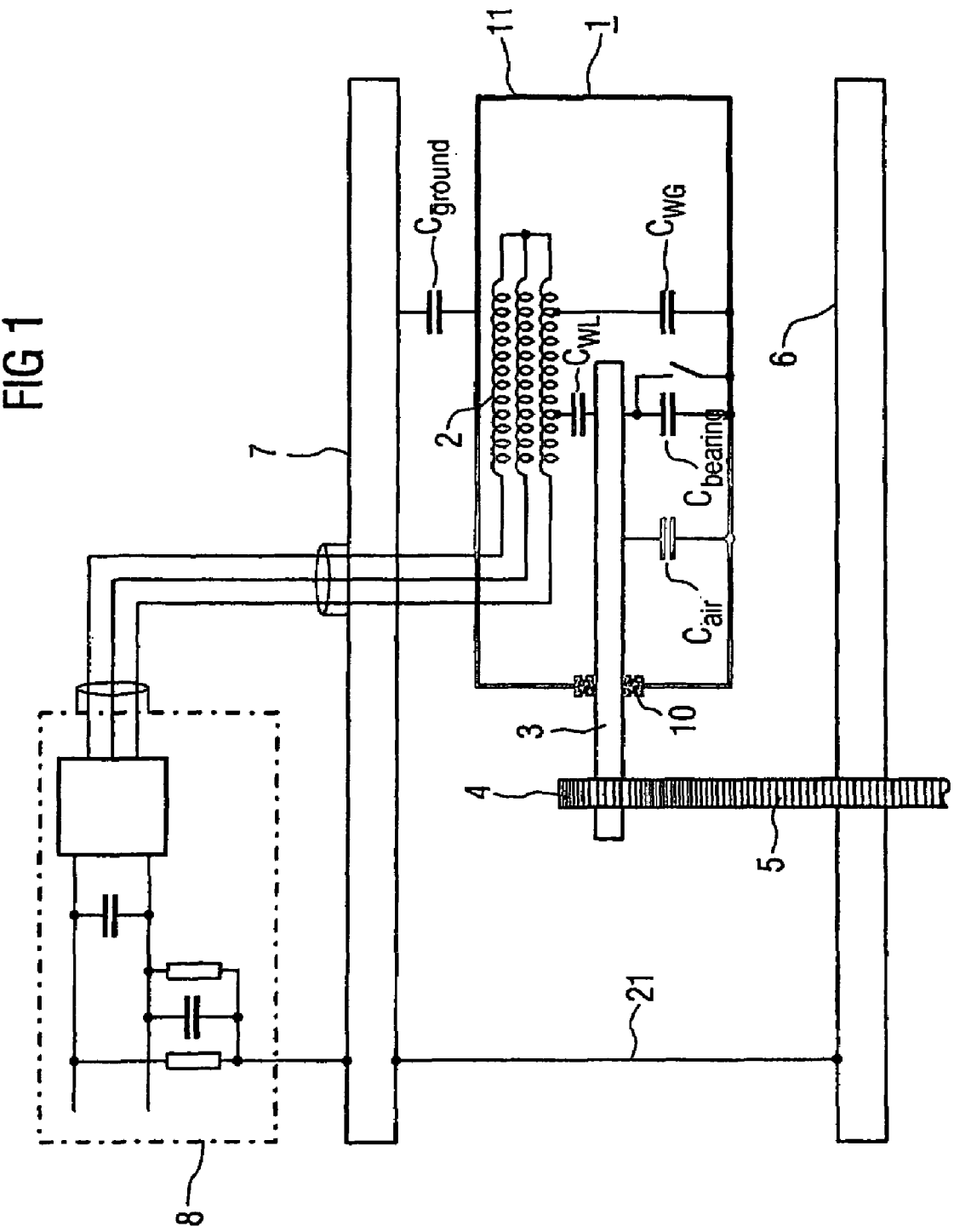
FIG. 1 shows capacitive grounding of the housing of a traction motor directly on the traction motor.

FIG. 1 is a basic illustration of a section of a vehicle with an electric drive through a traction motor 1 and a converter 8 via a wheel set shaft 6. The traction motor 1 is attached to a vehicle body by a king journal (not illustrated in more detail). The traction motor 1 drives a motor shaft 3 which in turn rotates the wheel set shaft 6 via a pinion 4 and a large wheel 5. The capacitor according to the invention is then located as a capacitive grounding means $C_{ground}$ between the housing 11 of the traction motor 1 and the vehicle body or chassis 7. The chassis 7 and/or the vehicle body form the vehicle ground which is also embodied as a protective ground. The vehicle ground is connected to the wheel set shaft 6 via an electrical connection 21, for example via a wheel set brush, and thus to the real ground via the drive wheels (not illustrated in more detail) with an electrically conductive connection.

Because of this grounding capacitor $C_{ground}$, the voltage across the bearings 10 can be significantly reduced so that the dielectric strength of the bearing lubrication film is not exceeded, or is only exceeded rarely. The capacitance of this grounding capacitor is 100-900 µF in large traction motors. The grounding capacitor is to be given smaller dimensions in correspondingly smaller traction motors 1.

Here, the capacitive voltage divider acts between the parasitic winding 2, housing capacitor $C_{WG}$ and the capacitance of the capacitor $C_{ground}$ between the housing 11 of the traction motor 1 and vehicle body or chassis 7 parallel to the air capacitance $C_{air}$ and bearing capacitance $C_{bearing}$. If the bearing voltage, that is to say the voltage across the grounding capacitor $C_{ground}$, the dielectric strength of the lubrication film in the static case of $U_{bearing}=0.5$ V or in the dynamic case of $U_{bearing}=2$ to 10 V is not exceeded, the lubrication film acts as an insulator and thus prevents the capacitive bearing currents and arc discharges.

Figure 2:
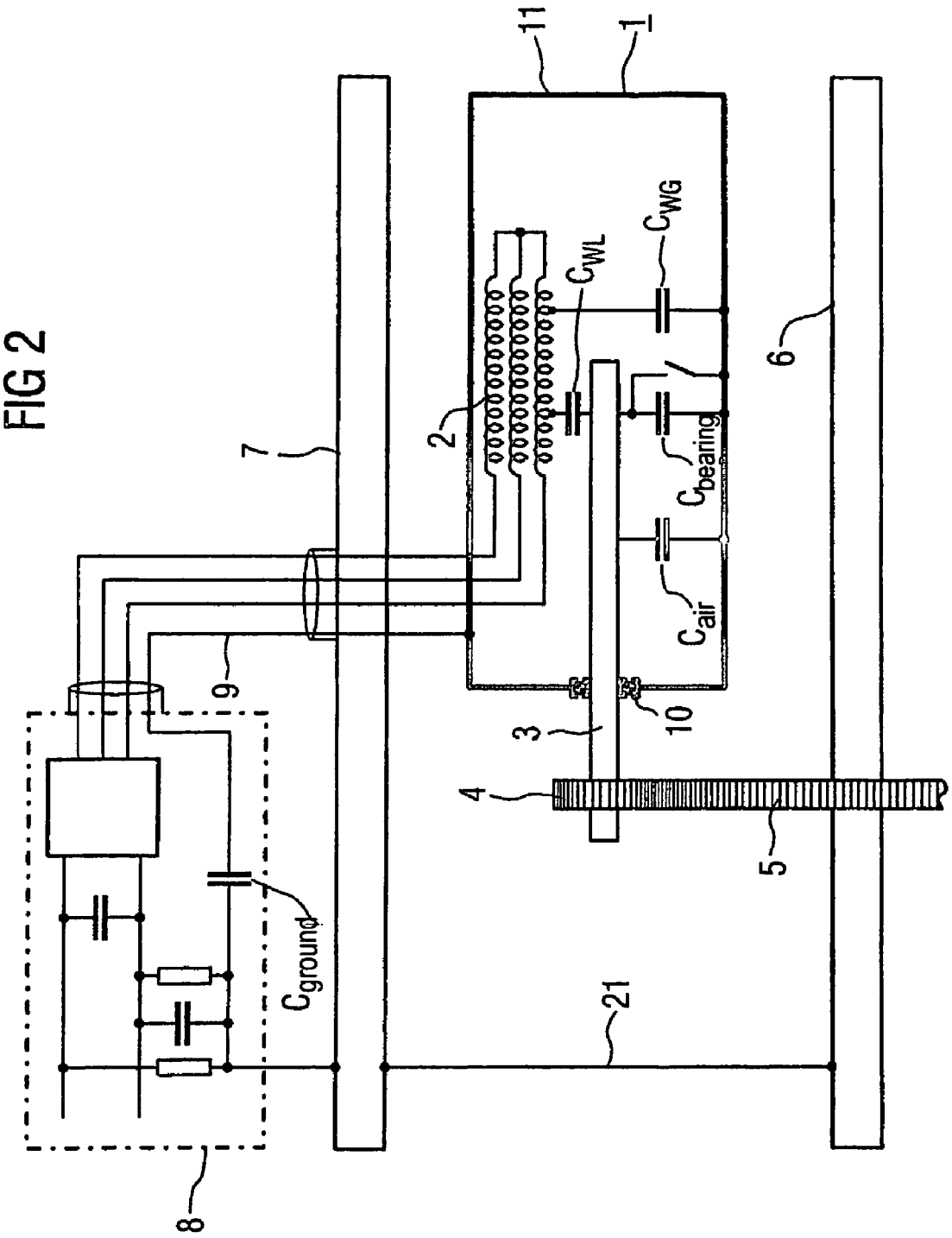
FIG. 2 shows capacitive grounding of the housing of a traction motor via a converter.

In one advantageous embodiment according to FIG. 2, the grounding with the capacitor $C_{ground}$ is preferably drawn into the converter 8 at low inductance. As a result, the mounting on the traction motor 1 can be simplified significantly since the converter 8 has, by its very nature, certain grounding devices to which the grounding capacitor $C_{ground}$ can be connected. The power cable 9 which serves to supply power has, in this case, a further conductor or a shielding with which the grounding potential is conducted from the traction motor 1 into the converter 8.

Figure 3:
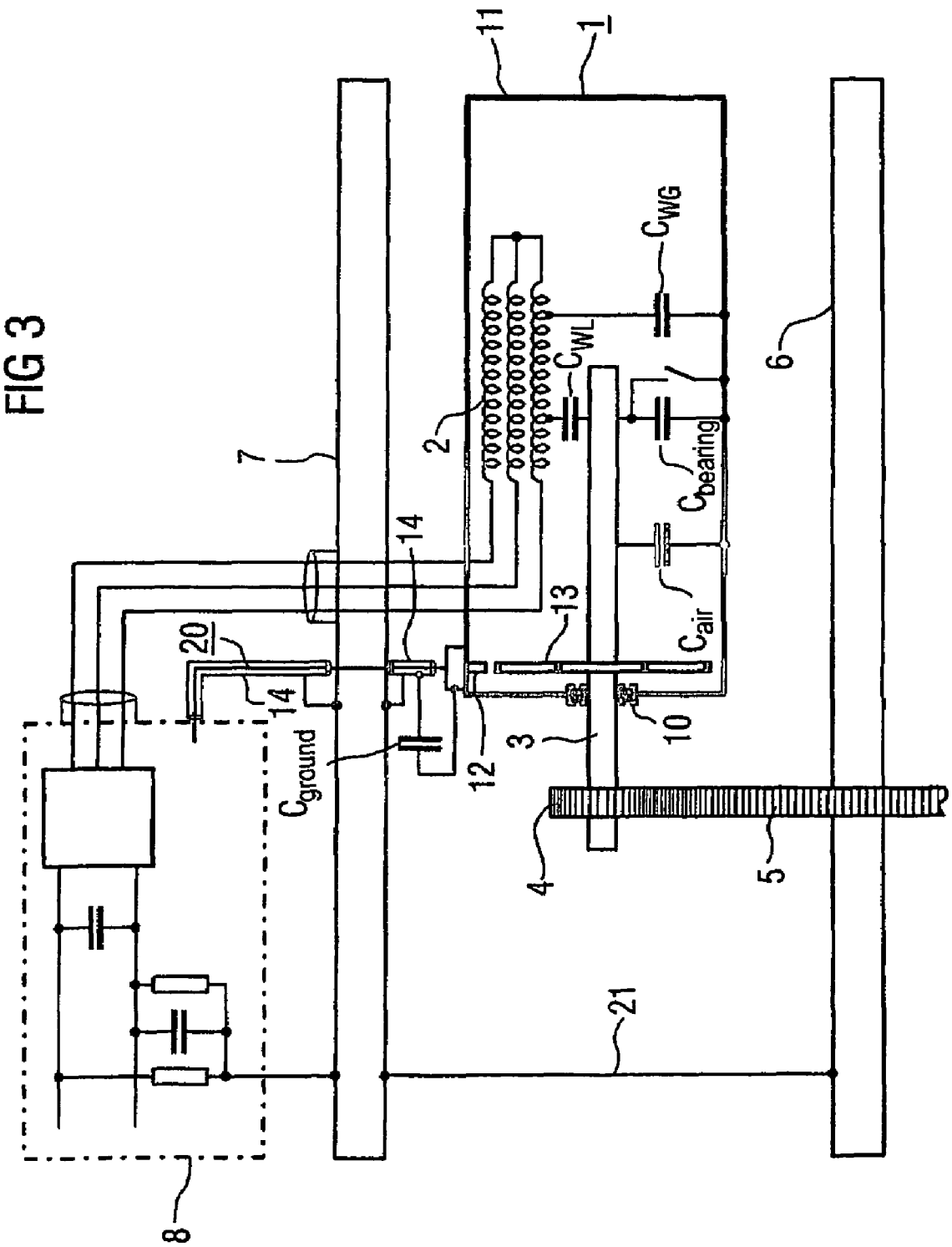
FIG. 3 shows capacitive grounding of the housing of a traction motor via a rotational speed sensor.

In a further advantageous refinement according to FIG. 3, the capacitive grounding of the traction motor 1 is implemented by means of a grounding capacitor $C_{ground}$ on or in the rotational speed sensor 12. The housing of the rotational speed sensor 12 is electrically conductively connected to the housing 11 of the traction motor 1 here. The grounding capacitor $C_{ground}$ is connected between the housing of the rotational speed sensor 12 and the shielding 14 of the rotational speed sensor cable 20.

Figure 4:
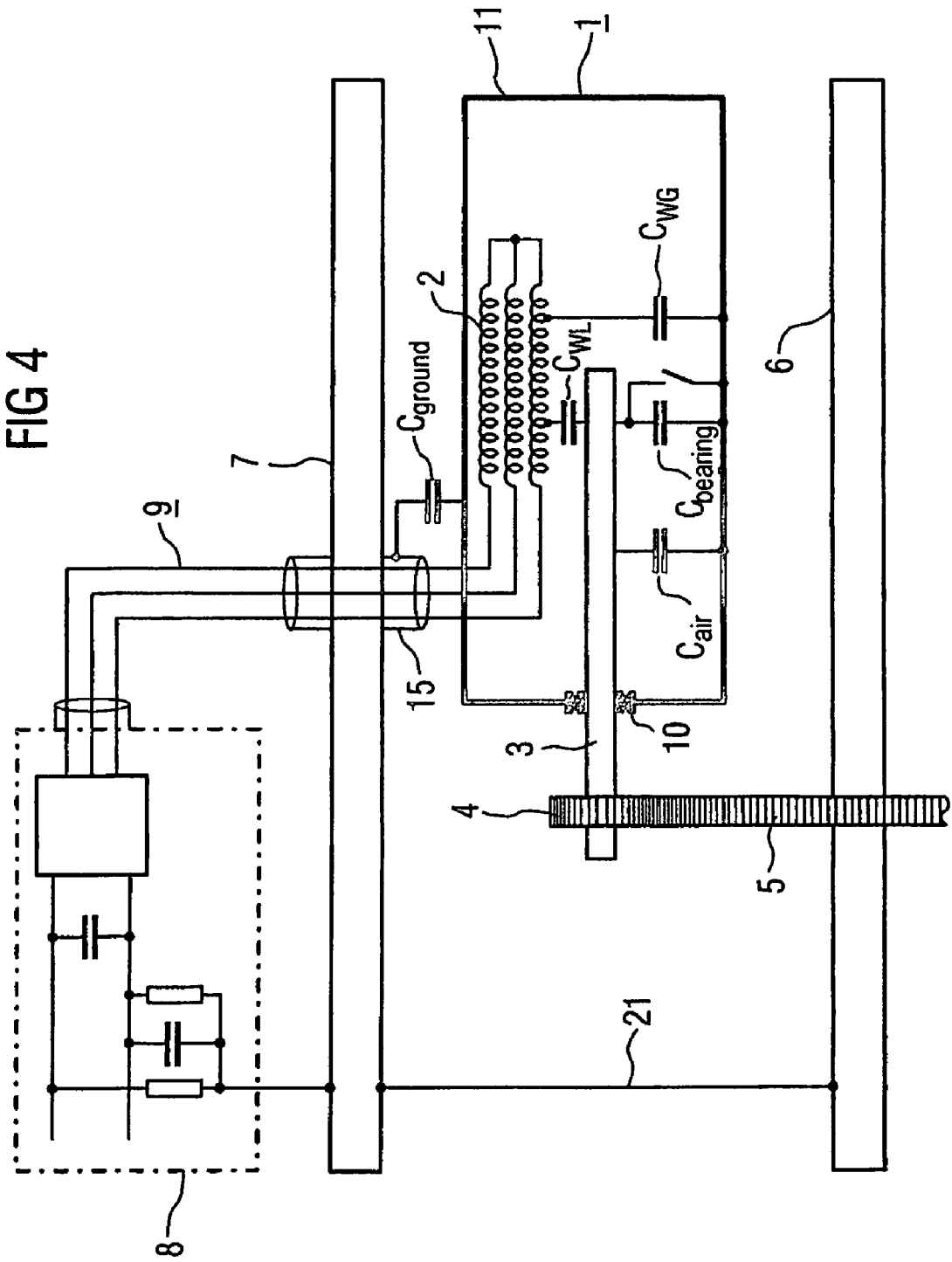
FIG. 4 shows capacitive grounding of the housing of a traction motor via shielding of the power cable

In a further advantageous embodiment according to FIG. 4, the capacitive grounding of the traction motor 1 is implemented by means of a grounding capacitor $C_{ground}$ between the housing 11 of the traction motor 1 and the shielding 15 of the power cable 9.

What is claimed is:

1. A traction drive system in a vehicle with an electric or diesel-electric drive, said vehicle representing a system ground potential, the drive system comprising:
   a housing capacitively coupled to ground potential;
   a traction motor received in the housing, said traction motor comprising a rotor shaft connected to ground potential via a drive gear and capacitively coupled to the housing, and a stator capacitively coupled to the housing and to ground potential; and
   at least one grounding capacitor connected between the housing and ground potential.

2. The traction drive system of claim 1, further comprising an electronic power actuating element for supply of power to the traction motor.

3. The traction drive system of claim 1, further comprising a rotational speed sensor for realizing a grounding connection between the housing and a vehicle ground.

4. The traction drive system of claim 1, further comprising a power cable for supply of power, and a shielding on the power cable for realizing a grounding connection between the housing and a vehicle ground.

5. The traction drive system claim 1, further comprising a converter for realizing a grounding connection between the housing and a vehicle ground.

6. The traction drive system of claim 5, further comprising a power cable for supply of power, wherein the grounding connection is realized via a separate line in the power supply cable.

7. The traction drive system claim 1, further comprising a motor shaft operated by the traction motor, and a bearing for support of the motor shaft, wherein the grounding capacitor monitors an electrical voltage across the bearing to generate a measured variable of an operative grounding connection.

8. The traction drive system of claim 5, further comprising a power cable for supply of power, and a shielding on the power cable, wherein the grounding connection is realized via the shielding of the power cable.

* * * * *